Patented Mar. 18, 1941

2,235,141

UNITED STATES PATENT OFFICE 2,235,141

TREATMENT OF ARTIFICIAL MATERIALS

Henry Dreyfus, London, and Robert Wighton Moncrieff, Spondon, near Derby, England, assignors to Celanese Corporation of America, a corporation of Delaware No Drawing. Application September 29, 1938, Serial No. 232,354. In Great Britain October 15, 1937

2 Claims. (Cl. 91—70)

This invention relates to the treatment of products comprising filaments, fibres, yarns, ribbons, fabrics or the like of artificial cellulosic material and has as its principal object to increase the resiliency of such products.

According to the invention, the resilience of such products is improved by impregnating said products with the components of a thermosetting synthetic resin in water-soluble form as such or in the form of a water-soluble intermediate condensation product, in the substantial absence of an acid catalyst, drying the impregnated products, introducing an acid catalyst without substantial removal of the synthetic resin components and effecting further condensation to a water-insoluble synthetic resin at a temperature below 100° C.

The process of the invention can be carried out, for example, by allowing urea and formaldehyde to react in aqueous solution to form a water-soluble condensation product, e. g. mono- or di-methylol urea, applying this in solution to the materials, drying them at ordinary temperatures, subjecting them to the vapour of hydrochloric acid or like acid catalyst, e. g. formic acid vapour, and finally effecting further condensation to form the desired water-insoluble condensation product at a temperature below 100° C., for example 50-60 or 70° C.

The rate of condensation can be controlled by the amount and strength of catalyst present and by the temperature. It is essential that the condensation should not proceed beyond water-solubility until impregnation of the material with the preliminary condensation product is complete. With this end in view the presence of substantial quantities of acid catalyst before and during impregnation is avoided. Thus, impregnation can be carried out in the presence, simply, of the small proportion of acid derived from the formaldehyde when this is used in the usual 40% solution; or even this small amount of catalyst may be reduced by the addition of a suitable mildly alkaline substance such as ammonia. Alkaline conditions enable the preliminary condensation before impregnation to be carried out more quickly than would otherwise be possible without disadvantage. Under such conditions the solution of the resin components can even be brought to the boil without producing a water-insoluble product.

The application of the catalyst in gas or vapour form to the impregnated products enables further condensation to be effected at a lower temperature than would otherwise be possible while avoiding the uneven distribution of catalyst which is inevitable if highly concentrated aqueous solutions of the catalyst are applied to the materials, and the removal of a part of the intermediate condensation product which must occur if dilute aqueous solutions of catalyst are applied after impregnation. The introduction of the catalyst after impregnation without danger of uneven distribution or of removal of part of the condensation product can be effected in other ways, for instance by applying an acid in solution in a liquid, e. g. ether, in which the preliminary condensation product is insoluble. Thus, for example, trichloracetic acid or oxalic acid can be applied in solution in ether and though it is preferred to employ such relatively strong acids, weaker acids such as cinnamic and benzoic acid can also be used.

Although the use of water-soluble intermediate condensation products of the synthetic resin components, e. g. dimethylol urea and monomethylol urea, is preferred, this is not an essential feature of the invention. Instead, the material may be impregnated not with an intermediate condensation product but with a mixture of the resin components themselves provided these are water-soluble. Thus, for example, a cellulose acetate fabric may be impregnated with formaldehyde and urea in aqueous solution and in substantially equal proportions by weight or equimolecular proportions. Since formaldehyde is soluble in most solvents which can conveniently be used to introduce the catalyst it is preferable when using such uncondensed or substantially uncondensed mixtures of resin components to apply the catalyst in gas or vapour form. On the other hand, it is less disadvantageous if a solvent used to introduce the catalyst into cellulose derivative materials should be miscible with formaldehyde than if it should be a solvent for the urea since the formaldehyde has a greater affinity for the materials treated than has the urea and so is less likely to be removed during the introduction of the catalyst.

The materials treated may be swollen before or during impregnation with the intermediate condensation product or its components; or swelling may be effected during the introduction of the catalyst.

Instead of urea and formaldehyde other thermosetting resin components can be used in admixture or in the form of water-soluble intermediate condensation products. For example acetaldehyde, benzaldehyde, furfural or other active aldehydes can be employed in place of formaldehyde, and thiourea, guanidine, biuret or dicyandiamide or phenols, instead of urea.

The drying step after impregnation of the materials may be carried out at temperatures above atmospheric but is preferably effected at ordinary temperature. The duration of the final heating step may vary according to the strength and amount of catalyst present from less than half an hour to several hours.

The amount of condensation product formed in the materials may range from 2–3% or less up to 6 or even 12% or more on the weight of the materials.

There may be present during the condensation substances such as glycerol or other alcohols of high molecular weight having a softening action on the materials and on the final condensation product.

The invention is of particular importance in connection with products having a basis of cellulose acetate. It can also be applied, however, to other water-resistant in-elastic materials, for example materials having a basis of nitro-cellulose acetate, cellulose propionate, cellulose butyrate, methyl, ethyl, propyl and benzyl cellulose, ethyl cellulose acetate, oxyethyl cellulose acetate, and other organic or mixed inorganic-organic derivatives of cellulose. Increasing the resiliency of such materials has hitherto presented considerable difficulty.

Although of particular importance in connection with products of ordinary, i. e. acetone-soluble, cellulose acetate the process of the invention can also be applied to partially saponified cellulose acetate products or to products of higher acetyl value such as can be obtained from unripened or less highly ripened cellulose acetate or by acetylation of ordinary cellulose acetate products. Similarly, in the case of products of other organic derivatives of cellulose the ester or ether content may be between 2 and 2½ or 3 groups per $C_6H_{10}O_5$ unit of cellulose or may be greater or less.

Moreover, the process of the invention may be applied to the treatment of products of regenerated cellulose especially products of high tenacity (i.e. in excess of about 1.5 gms. per denier), such as can be made by the complete saponification of cellulose ester yarns and the like which have been stretched considerably during or after spinning. The products may have a tenacity as high as 2 or 2.5 to 3 or 4 or more gms. per denier. Difficulty has hitherto been experienced in enhancing the resilience of such high tenacity products.

The following examples illustrate the invention:

Example 1

A bath is made up by dissolving 1 part of urea in 2½ parts of 40% formaldehyde and 2½ parts of water, all the parts being by weight. A fabric of cellulose acetate is padded with the solution and allowed to dry at ordinary temperature. It is then exposed for 1 hour at ordinary temperature to an atmosphere in equilibrium with 36% aqueous hydrochloric acid.

The fabric is then removed, scoured and dried.

Example 2

The process is carried out as in Example 1, except that the material is exposed to an atmosphere containing 0.2% by volume of hydrochloric acid gas at a temperature of 60° C. for 2 hours.

Example 3

1 part by weight of urea is dissolved in 2½ parts by weight of commercial 40% formaldehyde. The solution is made just alkaline with caustic soda, then brought to the boil and cooled rapidly by pouring it on to 3 parts of ice. The solution is made just acid by careful addition of acetic acid.

A fabric of high tenacity regenerated cellulosic yarn made by the complete saponification of high tenacity cellulose acetate yarn is padded with the solution and allowed to dry slowly at room temperature.

The dried material is exposed for 8 hours at ordinary temperature to an atmosphere containing 1% by volume of hydrochloric acid gas. The material is then removed, scoured and dried.

In any of the above examples the hydrochloric acid gas may be replaced by the vapour of formic acid, higher temperatures, concentrations or times of treatment being employed.

One of the most important effects of the process of the invention is to increase the resiliency of the products treated. Thus, as indicated above, the tendency of fabrics to crease can be considerably reduced by treatment according to the invention and similar effects can be obtained with foils. Further, particularly supple products are obtained by the process. Moreover, effects obtained by mechanical distortion of the materials can be rendered more permanent by the process of the invention. Use of this effect can be made in processes for embossing, beetling or otherwise producing mechanical effects on fabrics, foils and the like and in processes for imparting a crimp or curl to filaments, fibres or yarns. Filaments and fibres crimped, e. g. by passage through crimping rollers, may also be treated according to the invention to increase the permanence of the crimp produced. The process of the invention also renders the products even more resistant than formerly to the action of water and other aqueous liquids and may also alter the dye affinities of the products enabling them, for example, to be dyed with acid dyes and rendering them resistant to basic dyes.

Having described our invention what we desire to secure by Letters Patent is:

1. Process for the production of improved artificial textile materials which comprises increasing the resilience of products comprising filaments, fibers, yarns, ribbons, fabrics or the like of cellulose acetate by impregnating said products with synthetic resin components forming a water-soluble product, said synthetic resin components comprising formaldehyde and a substance selected from the class consisting of urea, thiourea and dicyandiamide in water soluble form, in the substantial absence of an acid catalyst, drying the impregnated products, applying an acid catalyst in the form of an acid gas to the impregnated products and effecting further condensation to a water-insoluble synthetic resin at a temperature between 50 and 70° C.

2. Process for the production of improved artificial textile materials which comprises increasing the resilience of products comprising filaments, fibers, yarns, ribbons, fabrics or the like of cellulose acetate by impregnating said products with synthetic resin components forming a water-soluble product, said synthetic resin components comprising formaldehyde and a substance selected from the class consisting of urea, thiourea and dicyandiamide in water soluble form, in the substantial absence of an acid catalyst and in the presence of a softening agent for the cellulose acetate and for the synthetic resin formed, drying the impregnated products, applying an acid catalyst in the form of hydrochloric acid gas to the impregnated products and effecting further condensation to a water-insoluble synthetic resin at a temperature between 50 and 70° C.

ROBERT WIGHTON MONCRIEFF.
HENRY DREYFUS.